(12) United States Patent
Koike et al.

(10) Patent No.: US 8,674,005 B2
(45) Date of Patent: Mar. 18, 2014

(54) FLAME RETARDANT RESIN COMPOSITION, METHOD FOR PRODUCTION THEREOF, AND MOLDED ARTICLE THEREOF

(75) Inventors: Makoto Koike, Ashigarakami-gun (JP); Yasunori Ichikawa, Ashigarakami-gun (JP); Yoshiyuki Miyoshi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 177 days.

(21) Appl. No.: 13/049,260

(22) Filed: Mar. 16, 2011

(65) Prior Publication Data
US 2011/0230600 A1   Sep. 22, 2011

(30) Foreign Application Priority Data

Mar. 19, 2010 (JP) .................. 2010-064596

(51) Int. Cl.
*C08L 1/14* (2006.01)
*C08L 69/00* (2006.01)
*C08K 5/3462* (2006.01)

(52) U.S. Cl.
USPC ............. 524/39; 524/100; 524/404; 524/413; 252/609

(58) Field of Classification Search
USPC ........... 524/39, 435, 436, 398, 417, 423, 431, 524/437; 428/90, 213, 323, 328, 330, 500, 428/515, 516, 920, 921, 379, 372
See application file for complete search history.

(56) References Cited

U.S. PATENT DOCUMENTS

| 2007/0207326 A1* | 9/2007 | Mizuno et al. ................ 428/447 |
| 2009/0182082 A1* | 7/2009 | Matsui .......................... 524/413 |
| 2010/0249286 A1* | 9/2010 | Yamaki et al. ................ 524/100 |

FOREIGN PATENT DOCUMENTS

| EP | 0972803 B1 | 5/2003 |
| EP | 1942173 A1 | 7/2008 |
| JP | 10-204298 A | 8/1998 |
| JP | 2000-086858 A | 3/2000 |
| JP | 2005-288254 A | 10/2005 |
| JP | 2006-232980 A | 9/2006 |
| JP | 2007-119508 A | 5/2007 |
| JP | 4339163 B2 | 10/2009 |

\* cited by examiner

Primary Examiner — James J Seidleck
Assistant Examiner — S. Camilla Pourbohloul
(74) Attorney, Agent, or Firm — Sughrue Mion, PLLC

(57) ABSTRACT

An object of the present invention is to provide a flame retardant resin composition including magnesium hydroxide particles and a cellulose resin and having excellent flame retardance, mechanical characteristics, and moldability. The flame retardant resin composition includes a thermoplastic resin including a cellulose resin and a flame retardant. The flame retardant includes, at 40% by weight to 60% by weight of the total flame retardant, a first type of magnesium hydroxide particles with a particle diameter of 10 nm to 50 nm, having a particulate surface modified by an epoxy silane coupling agent, and, at 60% by weight to 40% by weight of the total flame retardant, a second type of magnesium hydroxide particles with a particle diameter of 100 nm to 1,000 nm, having a particulate surface modified by an amino silane coupling agent.

11 Claims, 2 Drawing Sheets

FIG. 1

|  | Magnesium hydroxide particles A ||| Magnesium hydroxide particles B ||| Resin |
|  | Average particle diameter (nm) | Silane coupling agent | Amount (g) | Average particle diameter (nm) | Silane coupling agent | Amount (g) | Amount (g) |
| --- | --- | --- | --- | --- | --- | --- | --- |
| Example 1 | 10 | Epoxy | 1 | 100 | Amino | 1.5 | 47.5 |
| Example 2 | 10 | Epoxy | 1.5 | 100 | Amino | 1 | 47.5 |
| Example 3 | 10 | Epoxy | 6 | 100 | Amino | 9 | 35 |
| Example 4 | 10 | Epoxy | 9 | 100 | Amino | 6 | 35 |
| Example 5 | 50 | Epoxy | 1 | 1000 | Amino | 1.5 | 47.5 |
| Example 6 | 50 | Epoxy | 1.5 | 1000 | Amino | 1 | 47.5 |
| Example 7 | 50 | Epoxy | 6 | 1000 | Amino | 9 | 35 |
| Example 8 | 50 | Epoxy | 9 | 1000 | Amino | 6 | 35 |
| Comparative Example 1 | 10 | Epoxy | 0.5 | 100 | Amino | 2 | 47.5 |
| Comparative Example 2 | 10 | Epoxy | 12 | 100 | Amino | 3 | 35 |
| Comparative Example 3 | 50 | Epoxy | 0.5 | 1000 | Amino | 2 | 47.5 |
| Comparative Example 4 | 50 | Epoxy | 12 | 1000 | Amino | 3 | 35 |
| Comparative Example 5 | 5 | Epoxy | 1.25 | 100 | Amino | 1.25 | 47.5 |
| Comparative Example 6 | 75 | Epoxy | 1.25 | 100 | Amino | 1.25 | 47.5 |
| Comparative Example 7 | 10 | Epoxy | 1.25 | 50 | Amino | 1.25 | 47.5 |
| Comparative Example 8 | 10 | Epoxy | 1.25 | 1500 | Amino | 1.25 | 47.5 |
| Comparative Example 9 | 10 | Epoxy | 1.25 | 100 | Vinyl | 1.25 | 47.5 |
| Comparative Example 10 | 10 | Vinyl | 1.25 | 100 | Amino | 1.25 | 47.5 |

FIG. 2

| | Results of combustion test | | | Results of mechanical testing | | | Moldability |
|---|---|---|---|---|---|---|---|
| | Combustion time after the first flame application (sec.) | Combustion time after the second flame application (sec.) | Flame drip | Flexural modulus (GPa) | Maximum flexural strength (MPa) | Charpy impact strength (kJ/m$^2$) | |
| Example 1 | 7 | 8 | Not observed | 3.0 | 100 | 35 | A |
| Example 2 | 7 | 8 | Not observed | 3.0 | 100 | 35 | A |
| Example 3 | 1 | 2 | Not observed | 3.5 | 110 | 30 | A |
| Example 4 | 1 | 2 | Not observed | 3.5 | 110 | 30 | A |
| Example 5 | 9 | 10 | Not observed | 3.0 | 100 | 35 | A |
| Example 6 | 9 | 10 | Not observed | 3.0 | 100 | 35 | A |
| Example 7 | 3 | 4 | Not observed | 3.5 | 110 | 30 | A |
| Example 8 | 3 | 4 | Not observed | 3.5 | 110 | 30 | A |
| Comparative Example 1 | 10 | Burned down | Observed | | | | |
| Comparative Example 2 | | | | | | | B |
| Comparative Example 3 | Burned down | - | Observed | | | | |
| Comparative Example 4 | | | | | | | B |
| Comparative Example 5 | | | | | | | B |
| Comparative Example 6 | 10 | Burned down | Observed | | | | |
| Comparative Example 7 | | | | | | | B |
| Comparative Example 8 | | | | | | 5 | A |
| Comparative Example 9 | | | | | | 5 | A |
| Comparative Example 10 | Burned down | - | Observed | | | | |

FLAME RETARDANT RESIN COMPOSITION, METHOD FOR PRODUCTION THEREOF, AND MOLDED ARTICLE THEREOF

BACKGROUND OF THE INVENTION

1. Field of the Invention

The present invention relates to a flame retardant resin composition, a method for production thereof, and a molded article thereof, and particularly to a flame retardant resin composition comprising a cellulose resin, a method for production thereof, and a molded article thereof.

2. Description of the Related Art

Conventionally, petroleum resins such as a polyethylene resin, a polypropylene resin, vinyl chloride, polyamide, a polystyrene resin, and a PET (polyethylene terephthalate) resin, are widely used as a melt molding material including a material for injection molding and a material for extrusion.

Waste of daily necessaries and industrial products made from petroleum resins is recycled in part, but most of the waste is disposed by incineration, landfill and the like. Accordingly, cellulose resins attract attention as biomass resins to deal with global environmental problems such as global warming and running out of oil.

The cellulose resins are expected to be used for various purposes such as electrical and electronic equipment components, and materials for housing. When a resin composition comprising a cellulose resin is used for an exterior material of office automation equipment such as televisions and personal computers, the resin composition comprising a cellulose resin requires flame retardance, mechanical characteristics, and moldability.

Generally, in order for a resin as a polymer material to obtain flame retardance, a flame retardant is added to the polymer material. Representative examples of flame retardants include a halogen flame retardant, a phosphorous flame retardant, and an inorganic particle flame retardant. However, the halogen flame retardant has many problems on the environment such as the generation of halogen gas and black smoke at the time of combustion, and the generation of dioxin at the time of incineration. Furthermore, the phosphorous flame retardant has problems on the environment such as the generation of phosphine gas, and in addition, it has problems such as high prices and concerns about supplying mineral phosphate as a raw material.

On the other hand, magnesium hydroxide particles which are one of metal hydroxides representing inorganic particle flame retardants are harmless and have few problems on the environment. Furthermore, the magnesium hydroxide particles are inexpensive and can be derived from abundant raw material resources so that individual problems occurring in the halogen flame retardant or in the phosphorous flame retardant can be eliminated.

For a flame retardant comprising magnesium hydroxide particles, Japanese Patent Application Laid-Open No. 2007-119508 discloses the magnesium hydroxide particles which have a high flame retardance and a small amount of emission of carbon monoxide and smoke by including a transition metal compound at 100 to 1,000 ppm.

Japanese Patent Application Laid-Open No. 2000-086858 discloses a flame-retardant abrasion-resistant resin composition comprising a propylene-ethylene block copolymer, an ethylene-vinyl acetate copolymer, and a metal hydroxide represented by magnesium hydroxide, and further comprising a silane coupling agent having amino groups.

Japanese Patent Application Laid-Open No. 10-204298 discloses a flame retardant thermoplastic resin composition comprising a thermoplastic resin, a halogen flame retardant, a flame retardant agent, silicone, and magnesium hydroxide having particles with a particle diameter of 0.2 µm to 6 µm.

Japanese Patent Application Laid-Open No. 2006-232980 discloses a method for producing surface-coated flame retardant particles, comprising the steps of preparing a dispersion liquid of flame retardant particles with a particle diameter of 1 nm to 500 nm including magnesium hydrate in an aqueous solution in which metal salts of organic compounds and a dispersant are dissolved, and adding dropwise an acid aqueous solution into the dispersion liquid and depositing organic compounds on the surface of the flame retardant particles to form a coating layer.

SUMMARY OF THE INVENTION

As described above, when a cellulose resin is used as material for molded articles, the cellulose resin requires flame retardance, mechanical characteristics, and moldability. However, when a great amount of magnesium hydroxide is added in order to provide flame retardance, the cellulose resin has a problem of being deteriorated for the essential properties.

The magnesium hydroxide particles described in Japanese Patent Application Laid-Open No. 2007-119508 have a particle diameter of 0.5 µm to 5 µm, and as a result, the particles have a low flame retardant effect. Moreover, flame retardance, mechanical characteristics, and moldability required for resin compositions comprising a cellulose resin are not considered in Japanese Patent Application Laid-Open No. 2007-119508.

Japanese Patent Application Laid-Open No. 2000-086858 does not disclose the particle diameters of the magnesium hydroxide particles. Moreover, flame retardance, mechanical characteristics, and moldability required for resin compositions comprising a cellulose resin are not considered in Japanese Patent Application Laid-Open No. 2000-086858.

The magnesium hydroxide particles described in Japanese Patent Application Laid-Open No. 10-204298 have a particle diameter of 0.2 µm to 6 µm, and as a result, the particles have a low flame retardant effect. The flame retardant thermoplastic resin described in Japanese Patent Application Laid-Open No. 10-204298 includes the halogen flame retardant which has some problems on the environment and safety.

Japanese Patent Application Laid-Open No. 2006-232980 does not have a description on resins, and thus a high flame retardant effect cannot be expected. Moreover, Japanese Patent Application Laid-Open No. 2006-232980 does not have a specific description of surface coating materials, and a high flame retardant effect cannot be expected.

A reason for such problem is described below. That is, a high flame retardant effect achieved by a flame retardant is derived from dispersion (not aggregation) of the flame retardant in a resin, and therefore an important viewpoint is compatibility and affinity between the surface of the particles and the resin. However, Japanese Patent Application Laid-Open No. 2006-232980 does not have a description on materials of either the resin or the surface of the particles, and does not have a viewpoint of the compatibility and affinity between the surface of the particles and the resin. As a result, a high flame retardant effect cannot be expected.

The present invention has been achieved in view of such circumstances. An object of the present invention is to provide a flame retardant resin composition comprising magnesium hydroxide particles and a cellulose resin and having excellent flame retardance, excellent mechanical characteristics, and excellent moldability, a method for production thereof, and a molded article thereof.

The present inventors have conducted diligent research on magnesium hydroxide particles compounded as a flame retardant into a thermoplastic resin including a cellulose resin. As a result, the present inventors have found that a flame retardant resin composition having sufficient flame retardance, mechanical characteristics, and moldability can be obtained by adding a flame retardant comprising two types of magnesium hydroxide at a specific weight proportion, which have different particle diameters and have been subjected to different silane coupling treatments, into the thermoplastic resin including the cellulose resin. Thus, the present inventors have achieved the present invention.

One aspect of the present invention provides a flame retardant resin composition, comprising a thermoplastic resin including a cellulose resin, and a flame retardant, wherein a first magnesium hydroxide particles with a particle diameter of 10 nm to 50 nm, having a particulate surface modified by an epoxy silane coupling agent, constitutes 40% by weight to 60% by weight of the total flame retardant, and a second magnesium hydroxide particles with a particle diameter of 100 nm to 1,000 nm, having a particulate surface modified by an amino silane coupling agent, constitutes 60% by weight to 40% by weight of the total flame retardant.

According to one aspect of the present invention, the flame retardant comprises the first type of magnesium hydroxide particles with a particle diameter of 10 nm to 50 nm, the surface of which is modified by the epoxy silane coupling agent, at 40% by weight to 60% by weight of the total flame retardant, and comprises the second type of magnesium hydroxide particles with a particle diameter of 100 nm to 1,000 nm, the surface of which is modified by the amino silane coupling agent, at 60% by weight to 40% by weight of the total flame retardant. As a result, the flame retardant resin composition comprising the cellulose resin has excellent flame retardance, excellent mechanical characteristics, and excellent moldability.

According to another aspect of the present invention, the flame retardant is preferably included in a range from 5% by weight to 30% by weight of the total flame retardant resin composition.

According to another aspect of the present invention, the cellulose resin is preferably included at 50% by weight or more of the total thermoplastic resin.

According to another aspect of the present invention, it is preferable that the first type of magnesium hydroxide particles is present in a range from 45% by weight to 55% by weight of the total flame retardant and has a particle diameter of 10 nm to 30 nm, and the second type of magnesium hydroxide particles is present in a range from 55% by weight to 45% by weight of the total flame retardant and has a particle diameter of 100 nm to 500 nm.

Another aspect of the present invention provides a method for producing a flame retardant resin composition, comprising a step of melt-kneading a thermoplastic resin including a cellulose resin and a flame retardant, wherein a first magnesium hydroxide particles with a particle diameter of 10 nm to 50 nm, having a particulate surface modified by an epoxy silane coupling agent, constitutes 40% by weight to 60% by weight of the total flame retardant, and a second magnesium hydroxide particles with a particle diameter of 100 nm to 1,000 nm, having a particulate surface modified by an amino silane coupling agent, constitutes 60% by weight to 40% by weight of the total flame retardant.

Another aspect of the present invention provides a method for producing a flame retardant resin composition, comprising the steps of melt-kneading a thermoplastic resin including a cellulose resin, and adding a flame retardant into the kneaded material, wherein a first magnesium hydroxide particles with a particle diameter of 10 nm to 50 nm, having a particulate surface modified by an epoxy silane coupling agent, constitutes 40% by weight to 60% by weight of the total flame retardant, and a second magnesium hydroxide particles with a particle diameter of 100 nm to 1,000 nm, having a particulate surface modified by an amino silane coupling agent, constitutes 60% by weight to 40% by weight of the total flame retardant.

According to another aspect of the present invention, the flame retardant is preferably compounded in a range from 5% by weight to 30% by weight of the total flame retardant resin composition.

According to another aspect of the present invention, a molded article is produced by melting and molding any of the above described flame retardant resin composition.

The flame retardant resin composition of the present invention including the magnesium hydroxide particles and the cellulose resin has excellent flame retardance, excellent mechanical characteristics, and excellent moldability.

BRIEF DESCRIPTION OF THE DRAWINGS

FIG. 1 is a table showing formulations of Examples 1 to 8 and Comparative Examples 1 to 10; and FIG. 2 is a table showing results of combustion test, mechanical testing, and moldability in Examples 1 to 8 and Comparative Examples 1 to 10.

DETAILED DESCRIPTION OF THE PREFERRED EMBODIMENTS

The preferred embodiments of the present invention will be described in accordance with the accompanying drawings. The present invention is described through the following preferred embodiments, but can be modified by various methods without departing from the scope of the present invention to utilize, embodiments other than the present embodiments. Therefore, all the modifications within the scope of the present invention are included in the scope of claims. Herein, the range of numerical values represented by using "to" inbetween means the range including the numerical values of both ends.

A flame retardant resin composition in the present embodiments is a flame retardant resin composition comprising, a thermoplastic resin including a cellulose resin, and a flame retardant, wherein a first magnesium hydroxide particles with a particle diameter of 10 nm to 50 nm, having a particulate surface modified by an epoxy silane coupling agent, constitutes 40% by weight to 60% by weight of the total flame retardant, and a second magnesium hydroxide particles with a particle diameter of 100 nm to 1,000 nm, having a particulate surface modified by an amino silane coupling agent, constitutes 60% by weight to 40% by weight of the total flame retardant.

<Thermoplastic Resin>

(1) Cellulose Resin

A cellulose resin is defined as a resin comprising cellulose derivatives obtained by transforming hydroxy groups included in cellulose into the other functional groups. Examples of the cellulose resin which can be preferably used include diacetyl cellulose (DAC), triacetyl cellulose (TAC), cellulose acetate butyrate (CAB), and cellulose acetate propionate (CAP).

(2) Other Resins

In addition to the above described cellulose resin, there can be used petroleum resins such as polycarbonate, an ABS resin, and polyolefin. The reason why these petroleum resins are used is to give mechanical characteristics and moldability required depending on application for usage.

The cellulose resin preferably constitutes 50% by weight or more of the total thermoplastic resin. A higher quantitative ratio of the cellulose resin to the total thermoplastic resin enables the total thermoplastic resin to reduce environmental burdens.

<Flame Retardant>

The flame retardant used in the present embodiments comprises at least two types of magnesium hydroxide particles which have particles with different particle diameters and have been subjected to different silane coupling treatments.

The first type of magnesium hydroxide particles have a particle diameter of 10 nm to 50 nm, the surface of which is modified by the epoxy silane coupling agent. The second type of magnesium hydroxide particles have a particle diameter of 100 nm to 1,000 nm, the surface of which is modified by the amino silane coupling agent.

The above described particle diameter means a volume average particle diameter measured by the dynamic light scattering method (Microtrac UPA, Nikkiso Co., Ltd.)

The silane coupling agent is represented by the general formula R—Si(OR')$_3$, wherein R' is a methyl group, an ethyl group, or the like. The silane coupling agent is chemically bound to the magnesium hydroxide particles on the surface by hydrolysis and dehydration condensation of the group (OR').

The epoxy silane coupling agent has an epoxy group as a functional group represented by "R" in the general formula. Examples of the epoxy silane coupling agents which can be preferably used include (3-glycidoxypropyl)trimethoxysilane, (3-glycidoxypropyl)methyldiethoxysilane, and (3-glycidoxypropyl)triethoxysilane. The epoxy group and the cellulose resin form a chemical bond.

The amino silane coupling agent has an amino group as a functional group represented by "R" in the general formula. Examples of the amino silane coupling agents which can be preferably used include (3-aminopropyl)trimethoxysilane, (3-aminopropyl)triethoxysilane, and N-2-(aminoethyl)-3-aminopropyltrimethoxysilane. The amino group and the cellulose resin form a chemical bond.

The epoxy silane coupling agent has higher bonding strength with the cellulose resin compared with the amino silane coupling agent.

In the present embodiments, the first type of magnesium hydroxide particles with a smaller particle diameter are surface-treated with the epoxy silane coupling agent, and the second type of magnesium hydroxide particles with a larger particle diameter are surface-treated with the amino silane coupling agent.

The first type of magnesium hydroxide particles constitutes 40% by weight to 60% by weight of the total flame retardant, and the second type of magnesium hydroxide particles constitutes 60% by weight to 40% by weight of the total flame retardant.

The above is for the purpose of improving flame retardance, and balancing mechanical characteristics and moldability of the resin. The particles with a smaller particle diameter have a high flame retardant effect, but are prone to aggregation in the resin. Aggregation of the particles in the resin prevents the particles from improving flame retardance, and results in strength reduction. Therefore, there are used the particles with a smaller particle diameter and the particles with a larger particle diameter respectively, and the particles with a smaller particle diameter are prevented from aggregation in the resin by surface treatment with the epoxy silane coupling agent capable of forming covalent bonding with the cellulose resin.

On the other hand, if the particles with a larger particle diameter are also surface-treated with the epoxy silane coupling agent capable of forming covalent bonding with the cellulose resin, the particles are then increased in viscosity on melting, leading to lower moldability. The particles with a larger particle diameter are not so prone to aggregation as the particles with a smaller particle diameter, and the particles are thus prevented from poorer moldability by surface treatment with the amino silane coupling agent which has affinity but does not form covalent bonding.

As a method for producing magnesium hydroxide particles, the following method can be adopted. For example, an aqueous solution of a metal salt is combined with an aqueous solution of a hydroxide salt to deposit metal hydroxide particles. The obtained metal hydroxide particles are crystallized by hydrothermal reaction, and then are surface-treated with a silane coupling agent.

When the metal hydroxide particles are deposited, for example, the particles can be combined and deposited using a microdevice described in Japanese Patent No. 4339163.

In this context, in addition to the above described thermoplastic resin and flame retardant, various additive agents can be added to the flame retardant resin composition in the present embodiments, as needed. For example, additive agents such as a colorant, a plasticizer, and an antioxidant can be added to the resin composition.

<Method for Producing a Flame Retardant Resin Composition>

The flame retardant resin composition in the present embodiments can be produced, for example, by melt-kneading the thermoplastic resin including the cellulose resin and the flame retardant described above, with a twin-screw kneading extruder. Moreover, the flame retardant resin composition in the present embodiments can also be produced, by melt-kneading the above described thermoplastic resin including the cellulose resin with the twin-screw kneading extruder, and then adding the above described flame retardant to the resin.

EXAMPLES

The present invention will be more specifically illustrated according to the following Examples. Materials, usages, ratios, treatments, procedures, and the like shown in the following Examples can be optionally modified without departing from the gist of the present invention. Therefore, the scope of the present invention is not limited to the following specific examples.

The formulations of Examples 1 to 8 and Comparative Examples 1 to 10 are shown in a table in FIG. 1. Magnesium hydroxide particles A and magnesium hydroxide particles B were prepared, based on the formulation in the table in FIG. 1. KBM-403 (Shin-Etsu Chemical Co., Ltd.) as an epoxy silane coupling agent and KBE-903 (Shin-Etsu Chemical Co., Ltd.) as an amino silane coupling agent were used, respectively. And also, KBE-1003 (Shin-Etsu Chemical Co., Ltd.) as a vinyl silane coupling agent was used. The epoxy silane coupling agent was added at 1% by the weight of the magnesium hydroxide particles A, and the amino silane coupling agent was added at 1% by the weight of the magnesium hydroxide particles B.

Cellulose acetate propionate (CAP) and polycarbonate (PC) as thermoplastic resins were provided in the form of pellets. The ratio by weight of CAP to PC was 1:1.

According to the table in FIG. 1, the magnesium hydroxide particles A, the magnesium hydroxide particles B, and the thermoplastic resin were kneaded using a kneading machine at 230° C. for 5 minutes. Then the resulting mixture was injection molded at 230° C. under 0.2 MPa to obtain test specimens for a combustion test and a mechanical testing.

Then, the test specimens prepared in this way were tested as follows.

(1) Combustion Test

The combustion test was conducted in accordance with the standard (UL94 V-0, V-1, V-2) of the UL combustion test method.

(2) Mechanical Testing

The mechanical testing was conducted in accordance with the following Japanese Industrial Standards (JIS).
Flexural modulus: JIS K7171
Testing machine: AUTOGRAPH AGS (Shimadzu Corporation)
Maximum flexural strength: JIS K7171
Testing machine: AUTOGRAPH AGS (Shimadzu Corporation)
Charpy impact strength: JIS K7111
Testing machine: IMPACT TESTER (Togo Seiki Seisakusho, Ltd.)

(3) Moldability

On preparing test specimens for the Charpy impact strength test, the test specimens were evaluated as to whether they could be molded into a shape of 80 mm in length, 10 mm in width, and 4 mm in thickness. The evaluation was described in a table in FIG. 2, wherein "A" designated the case being successful in molding, and "B" designated the case being unsuccessful in molding.

The table in FIG. 2 shows the results of the combustion test, the mechanical testing, and the moldability in Examples 1 to 8 and Comparative Examples 1 to 10. According to the table in FIG. 2, the flame retardant in the flame retardant resin composition in Examples 1 to 8 comprises, at 40% by weight to 60% by weight of the total flame retardant, the magnesium hydroxide particles A with a particle diameter of 10 nm to 50 nm, having a particulate surface modified by the epoxy silane coupling agent, and comprises, at 60% by weight to 40% by weight of the total flame retardant, the magnesium hydroxide particles B with a particle diameter of 100 nm to 1,000 nm, having a particulate surface modified by the amino silane coupling agent. As a result, there were obtained excellent results on each of the combustion test, the mechanical testing, and the moldability.

On the other hand, in Comparative Example 1, there was a smaller amount of the magnesium hydroxide particles A with a smaller particle diameter, and as a result the particles had a low flame retardant effect. In Comparative Example 2, there was a larger amount of the magnesium hydroxide particles A with a smaller particle diameter, and as a result the particles had a low fluidity and a low moldability. In Comparative Example 3, there was a smaller amount of the magnesium hydroxide particles A with a smaller particle diameter, and as a result the particles had a low flame retardant effect. In Comparative Example 4, there was a larger amount of the magnesium hydroxide particles A with a smaller particle diameter, and as a result the particles had a low fluidity and a low moldability.

In Comparative Example 5, the magnesium hydroxide particles A had a particle diameter of 5 nm, and as a result the particles had a low fluidity and a low moldability. In Comparative Example 6, the magnesium hydroxide particles A had a particle diameter of 75 nm, and as a result the particles had a low flame retardant effect. In Comparative Example 7, the magnesium hydroxide particles B had a particle diameter of 50 nm, and as a result the particles had a low fluidity and a low moldability.

In Comparative Example 8, the magnesium hydroxide particles B had a particle diameter of 1,500 nm, and as a result the particles were fragile and had a low Charpy impact strength. In Comparative Example 9, the magnesium hydroxide particles B were surface-treated with the vinyl silane coupling agent. Accordingly, the magnesium hydroxide particles B were aggregated without affinity with the thermoplastic resin, and as a result the particles were fragile and had a low Charpy impact strength. In Comparative Example 10, the magnesium hydroxide particles A were surface-treated with the vinyl silane coupling agent. Accordingly, the magnesium hydroxide particles A were aggregated without affinity with the thermoplastic resin, and as a result the particles had a low flame retardant effect. In the table in FIG. 2, diagonal lines show that the test was not conducted.

What is claimed is:

1. A flame retardant resin composition, comprising:
a thermoplastic resin including a cellulose resin; and
a flame retardant, wherein
a first magnesium hydroxide particles with a particle diameter of 10 nm to 50 nm, having a particulate surface modified by an epoxy silane coupling agent, constitutes 40% by weight to 60% by weight of the total flame retardant, and
a second magnesium hydroxide particles with a particle diameter of 100 nm to 1,000 nm, having a particulate surface modified by an amino silane coupling agent, constitutes 60% by weight to 40% by weight of the total flame retardant.

2. The flame retardant resin composition according to claim 1, wherein flame retardant resin composition comprises the flame retardant in a range from 5% by weight to 30% by weight of the total flame retardant resin composition.

3. The flame retardant resin composition according to claim 1, wherein the cellulose resin is included at 50% by weight or more of the total thermoplastic resin.

4. The flame retardant resin composition according to claim 2, wherein the cellulose resin is included at 50% by weight or more of the total thermoplastic resin.

5. The flame retardant resin composition according to claim 1, wherein
the first type of magnesium hydroxide particles is present in a range from 45% by weight to 55% by weight of the total flame retardant, and has a particle diameter of 10 nm to 30 nm; and
the second type of magnesium hydroxide particles is present in a range from 55% by weight to 45% by weight of the total flame retardant, and has a particle diameter of 100 nm to 500 nm.

6. The flame retardant resin composition according to claim 4, wherein
the first type of magnesium hydroxide particles is present in a range from 45% by weight to 55% by weight of the total flame retardant, and has a particle diameter of 10 nm to 30 nm; and
the second type of magnesium hydroxide particles is present in a range from 55% by weight to 45% by weight of the total flame retardant, and has a particle diameter of 100 nm to 500 nm.

7. A method for producing a flame retardant resin composition, comprising a step of melt-kneading a thermoplastic resin including a cellulose resin and a flame retardant, wherein
   a first magnesium hydroxide particles with a particle diameter of 10 nm to 50 nm, having a particulate surface modified by an epoxy silane coupling agent, constitutes 40% by weight to 60% by weight of the total flame retardant, and
   a second magnesium hydroxide particles with a particle diameter of 100 nm to 1,000 nm, having a particulate surface modified by an amino silane coupling agent, constitutes 60% by weight to 40% by weight of the total flame retardant.

8. The method for producing a flame retardant resin composition according to claim 7, wherein the flame retardant is compounded in a range from 5% by weight to 30% by weight of the total flame retardant resin composition.

9. A method for producing a flame retardant resin composition, comprising the steps of:
   melt-kneading a thermoplastic resin including a cellulose resin; and
   adding a flame retardant into the kneaded material, wherein
   a first magnesium hydroxide particles with a particle diameter of 10 nm to 50 nm, having a particulate surface modified by an epoxy silane coupling agent, constitutes 40% by weight to 60% by weight of the total flame retardant, and
   a second magnesium hydroxide particles with a particle diameter of 100 nm to 1,000 nm, having a particulate surface modified by an amino silane coupling agent, constitutes 60% by weight to 40% by weight of the total flame retardant.

10. The method for producing a flame retardant resin composition according to claim 9, wherein the flame retardant is compounded in a range from 5% by weight to 30% by weight of the total flame retardant resin composition.

11. A molded article obtained by melting and molding the flame retardant resin composition according to claim 1.

* * * * *